United States Patent
Tak et al.

(10) Patent No.: US 12,536,176 B2
(45) Date of Patent: Jan. 27, 2026

(54) COMBINING STRUCTURED QUERY LANGUAGE (SQL) QUERIES

(71) Applicant: Capital One Services, LLC, McLean, VA (US)

(72) Inventors: Vishal Tak, Plano, TX (US); Andrew Lamar Dawson, Plano, TX (US); Samuel Michael Bethge, Plano, TX (US); Kumaran Arulmani, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/465,051

(22) Filed: Sep. 11, 2023

(65) Prior Publication Data

US 2025/0086184 A1    Mar. 13, 2025

(51) Int. Cl.
*G06F 16/2455* (2019.01)

(52) U.S. Cl.
CPC .............................. *G06F 16/24553* (2019.01)

(58) Field of Classification Search
CPC ................................................ G06F 16/24553
See application file for complete search history.

(56) References Cited

U.S. PATENT DOCUMENTS

2014/0172833 A1* 6/2014 Taylor ............... G06F 16/24534
                                                           707/722
2022/0245140 A1* 8/2022 Gylfason ................... G06F 9/54

FOREIGN PATENT DOCUMENTS

CN        114238380 A *    3/2022

OTHER PUBLICATIONS

Vamsi Krishna Myalapalli and Muddu Butchi Shiva, "An appraisal to optimize SQL queries," 2015 International Conference on Pervasive Computing (ICPC), Pune, India, 2015, pp. 1-6, doi: 10.1109/PERVASIVE.2015.7087000. (Year: 2015).*
GitHub—tobymao/sqlglot: Python SQL Parser and Transpiler, 12 pages, retrieved on Jul. 7, 2023, available at https://github.com/tobymao/sqlglot#readme.
Joe Reynolds, sql-lint Documentation, Release 0.0.11; 23 pages, Mar. 30, 2023.

* cited by examiner

*Primary Examiner* — Khanh B Pham
*Assistant Examiner* — Samuel C Sharpless, III
(74) *Attorney, Agent, or Firm* — Harrity & Harrity, LLP

(57) ABSTRACT

In some implementations, a system may identify a plurality of SQL queries. The system may determine that the plurality of SQL queries is configured to manage data associated with a database via respective accesses of the database. The system may combine, based at least in part on determining that the plurality of SQL queries is configured to manage the data associated with the database, the plurality of SQL queries into a combined SQL query configured to manage the data associated with the database via a combined access of the database.

19 Claims, 4 Drawing Sheets

COMBINING STRUCTURED QUERY LANGUAGE (SQL) QUERIES

BACKGROUND

Structured query language (SQL) (sometimes referred to as "sequel") is a domain-specific language used in programming and designed for managing data held in relational databases and/or for stream processing in a relational data stream, among other examples. SQL may be useful in handling structured data, such as data incorporating relations among entities and variables. SQL may enable multiple records to be accessed via a single command without specifying how to reach a record (e.g., with or without an index).

SUMMARY

Some implementations described herein relate to a system for SQL query combination. The system may include one or more memories and one or more processors communicatively coupled to the one or more memories. The one or more processors may be configured to identify a plurality of SQL queries. The one or more processors may be configured to determine that the plurality of SQL queries is configured to manage data associated with a database via respective accesses of the database. The one or more processors may be configured to combine, based at least in part on determining that the plurality of SQL queries is configured to manage the data associated with the database, the plurality of SQL queries into a combined SQL query configured to manage the data associated with the database via a combined access of the database.

Some implementations described herein relate to a method for SQL query combination. The method may include determining, by a system, that a plurality of SQL queries is configured to manage data associated with a database via respective accesses of the database. The method may include combining, by the system, based at least in part on determining that the plurality of SQL queries is configured to manage the data associated with the database, the plurality of SQL queries into a combined SQL query. The method may include managing the data associated with the database, by executing the combined SQL query, via a combined access of the database.

Some implementations described herein relate to a non-transitory computer-readable medium that stores a set of instructions. The set of instructions, when executed by one or more processors of a system for SQL query combination, may cause the SQL to identify a plurality of SQL queries. The set of instructions, when executed by one or more processors of the SQL, may cause the SQL to determine that the plurality of SQL queries is configured to retrieve data from a database via respective accesses of the database. The set of instructions, when executed by one or more processors of the SQL, may cause the SQL to combine, based at least in part on determining that the plurality of SQL queries is configured to retrieve the data from the database, the plurality of SQL queries into a combined SQL query configured to retrieve the data from the database via a combined access of the database.

DETAILED DESCRIPTION

The following detailed description of example implementations refers to the accompanying drawings. The same reference numbers in different drawings may identify the same or similar elements.

Multiple SQL queries often access the same database. For example, the SQL queries may retrieve data stored in the same database. When executed, the SQL queries may repeatedly access the same database. Each access of the database may involve computing and/or power resources associated with opening the database to enable an SQL query to retrieve data from the database. Thus, respective (e.g., repeated) accesses of the same database can, at scale, use an inordinate amount of computing and/or power resources. Furthermore, because each access involves a time window associated with opening of the database, repeatedly accessing the database can introduce delay to the data retrieval from the database. Using a left join statement to join the multiple SQL queries would still involve repeated access of the database.

Some implementations described herein combine (e.g., coalesce) multiple SQL queries that are configured to respectively (e.g., repeatedly) access (e.g., open) a database (e.g., a table). Some aspects may involve identifying patterns between SQL queries by tracking inefficient (e.g., respective) database calls to the same database across the multiple (e.g., different) SQL queries, looping through each SQL query and tracking the database name and the structure of the SQL query, and combining (e.g., coalescing) the multiple SQL queries based on similar (e.g., matching) database access. The resulting combined SQL query may be configured to access the database once to retrieve all the data associated with the multiple SQL queries.

As a result, by accessing the database once, the combined SQL query may be a single, optimized query that can reduce computing and/or power resources involved in retrieving all the data associated with the multiple SQL queries. Accessing the database once, instead of repeatedly, may also reduce delay associating with accessing and retrieving the data associated with the multiple SQL queries. Thus, combining (e.g., coalescing) the SQL queries may provide fewer reads and/or faster results (e.g., quick data retrieval). These effects may be particularly pronounced at scale (e.g., in large-scale data processing use cases). Combined SQL query may be used repeatedly, thereby further saving computing, power, and/or time resources. For example, the time resources may be re-allocated for optimization of the SQL queries before generating the combined SQL query. Handling SQL queries as described herein (e.g., exploiting patterns in, and seamlessly merging, SQL queries with shared database access) may create a faster and more streamlined approach to data retrieval, thereby optimizing database performance and efficiency.

Figure 1:
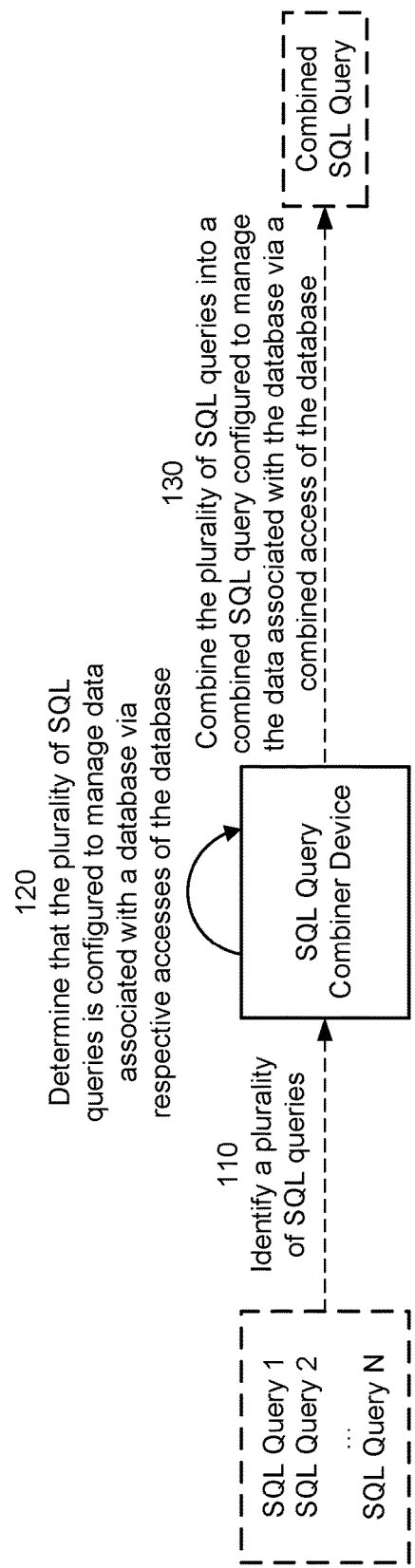
FIG. 1 is a diagram of an example associated with combining SQL queries, in accordance with some embodiments of the present disclosure.

FIG. 1 is a diagram of an example 100 associated with combining SQL queries. As shown in FIG. 1, example 100 includes a SQL query combiner device, which is described in more detail in connection with FIGS. 2 and 3.

As shown by reference number 110, the SQL query combiner device may identify a plurality of SQL queries (e.g., SQL query 1, SQL query 2, . . . . SQL query N). The plurality of SQL queries may be stored and configured to be executed repeatedly. In some aspects, the plurality of SQL queries may be associated with an exchange involving a vehicle. For example, the plurality of SQL queries may be executed in response to a prompt (e.g., an auto loan application). Prompts may occur at any suitable rate (e.g., hundreds or thousands of prompts per day). The plurality of SQL queries may number in the hundreds, thousands, or any other suitable quantity.

As shown by reference number 120, the SQL query combiner device may determine that the plurality of SQL queries is configured to manage (e.g., retrieve) data associated with (e.g., stored in) a database via respective accesses of the database. For example, the plurality of SQL queries may be configured to access or open the same database multiple times. For example, SQL query 1 may be configured to access the database and retrieve data, SQL query 2 may be configured to separately access the database and retrieve data, or the like. The plurality of SQL queries may be configured to manage any suitable data, such as analytical data associated with auto loan applications (e.g., user age or the like).

In some aspects, the SQL query combiner device may determine that the plurality of SQL queries is configured to manage the data associated with the database based at least in part on a plurality of from statements in the plurality of SQL queries. A from statement may specify the database that stores the target data (e.g., the data to be retrieved or otherwise managed). For example, the SQL query combiner device may, for each SQL query, determine the database contained in a from statement. The SQL query combiner device may determine that the plurality of SQL queries identifies, in the plurality of from statements, the same database.

As shown by reference number 130, the SQL query combiner device may combine, based at least in part on determining that the plurality of SQL queries is configured to manage the data associated with the database, the plurality of SQL queries into a combined SQL query configured to manage the data associated with the database via a combined access of the database. For example, the combined SQL query may, when executed, retrieve all the data associated with the plurality of SQL queries via a single access of the database.

In some aspects, the SQL query combiner device may combine the plurality of SQL queries by combining the plurality of select statements into a combined select statement. A select statement identifies the attributes (e.g., data type) for the data to be managed for (e.g., retrieved from) the database. For example, the SQL query combiner device may combine the plurality of select statements, contained in the plurality of SQL queries, into a single select statement that indicates all of the attributes from the plurality of select statements.

In some aspects, the SQL query combiner device may determine that the plurality of SQL queries includes a plurality of case statements and combine the plurality of SQL queries by inserting the plurality of case statements into the combined SQL query. A case statement may define conditions and return a result (e.g., data from the database) when a condition is met. The SQL query combiner device may combine any case statements in the plurality of SQL queries under the combined select statement.

In some aspects, the combined SQL query may be executed. Executing the combined SQL query may cause the SQL query to access the database once via a combined access of the database. For example, the combined SQL query may make a single call to the database such that the database is accessed (e.g., opened) once, and the combined SQL query can manage (e.g., retrieve) the data associated with the database.

Provided below is example pseudocode for two separate SQL queries, both configured to manage data associated with the same database via respective accesses of that database. As shown, SQL query 1 is configured to retrieve data associated with attributes 1 and 2 from database 1 based on case statement 1, and SQL query 2 is configured to retrieve data associated with attribute 3 from database 1 based on case statement 2.

SQL Query 1:
   SELECT [ATTRIBUTE 1], [ATTRIBUTE 2]
   [CASE 1]
   FROM [DATABASE 1]
SQL Query 2:
   SELECT [ATTRIBUTE 3]
   [CASE 2]
   FROM [DATABASE 1]

Provided below is example pseudocode for a combined SQL query generated from the two SQL queries described above. As shown, the combined SQL query includes a combined select statement containing attributes 1-3, case statements 1 and 2 inserted under the select statement, and a from statement identifying database 1.

Combined SQL Query:
   SELECT [ATTRIBUTE 1], [ATTRIBUTE 2], [ATTRIBUTE 3]
   [CASE 1]
   [CASE 2]
   FROM [DATABASE 1]

In some aspects, the SQL query combiner device may generate, based at least in part on determining that the plurality of SQL queries is configured to manage the data associated with the database, a dictionary that maps the plurality of SQL queries to the database. For example, the dictionary may correlate the plurality of SQL queries with the database(s) indicated in the from statements of the plurality of SQL queries. The SQL query combiner device may combine the plurality of SQL queries based at least in part on the dictionary. For example, the SQL query combiner device may determine which SQL queries access the same database based on the mapping defined by the dictionary.

In some aspects, the SQL query combiner device may determine that at least one SQL query of the plurality of SQL queries has been updated and determine, based at least in part on determining that the at least one SQL query has been updated, whether the plurality of SQL queries is configured to manage the data associated with the database. For example, the SQL query combiner device may, in response to an update to the at least one SQL query, repeat the process illustrated in FIG. 1. For example, the SQL query combiner device may determine that one or more SQL queries of the plurality of SQL queries are configured to manage (e.g., retrieve) data associated with the same database via respective accesses of the database and combine the one or more SQL queries into an updated combined SQL query.

Combining the plurality of SQL queries may conserve computing and power resources associated with managing (e.g., retrieving) data from a database, and may reduce delay times associated with managing the data, by reducing a quantity of accesses (e.g., calls) to the database to manage the data. Combining the plurality of select statements and/or inserting the plurality of case statements may enable the combined SQL query to preserve the functionality of the select and/or case statements from the plurality of SQL queries. Determining that the plurality of SQL queries is configured to manage the data associated with the database based at least in part on the plurality of from statements may enable the SQL query combiner device to determine that the plurality of SQL queries are configured to manage data associated with the same database. Combining the plurality of SQL queries based at least in part on the dictionary may enable the SQL query combiner device to optimize a search for SQL queries with matching databases and efficiently combine the SQL queries. Determining whether the plurality of SQL queries is configured to manage the data associated with the database based at least in part on determining that the at least one SQL query has been updated may help to ensure that the combined SQL query reflects any updates (e.g., changes) to the plurality of SQL queries.

As indicated above, FIG. 1 is provided as an example. Other examples may differ from what is described with regard to FIG. 1.

Figure 2:
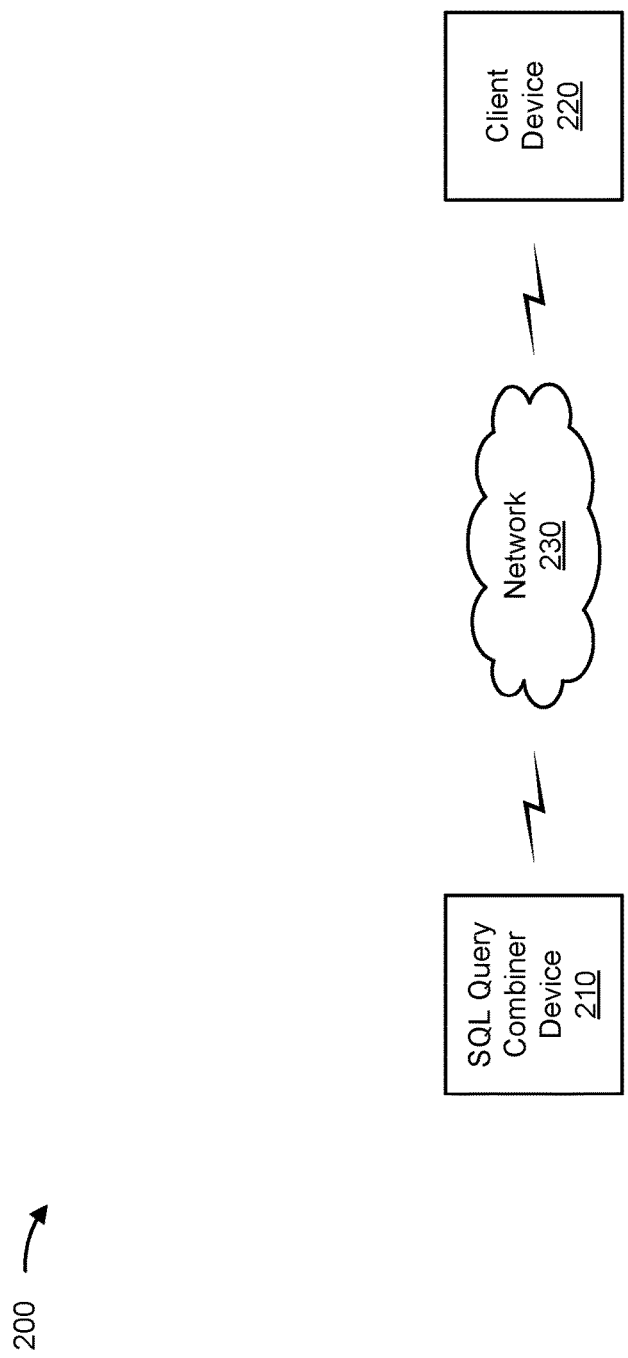
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include an SQL query combiner device 210, a client device 220, and a network 230. Devices of environment 200 may interconnect via wired connections, wireless connections, or a combination of wired and wireless connections.

The SQL query combiner device 210 may include one or more devices capable of receiving, generating, storing, processing, providing, and/or routing information associated with combining SQL queries, as described elsewhere herein. The SQL query combiner device 210 may include a communication device and/or a computing device. For example, the SQL query combiner device 210 may include a server, such as an application server, a client server, a web server, a database server, a host server, a proxy server, a virtual server (e.g., executing on computing hardware), or a server in a cloud computing system. In some implementations, the SQL query combiner device 210 may include computing hardware used in a cloud computing environment.

The client device 220 may include one or more devices capable of receiving, generating, storing, processing, and/or providing information associated with combining SQL statement, as described elsewhere herein. The client device 220 may include a communication device and/or a computing device. For example, the client device 220 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 230 may include one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
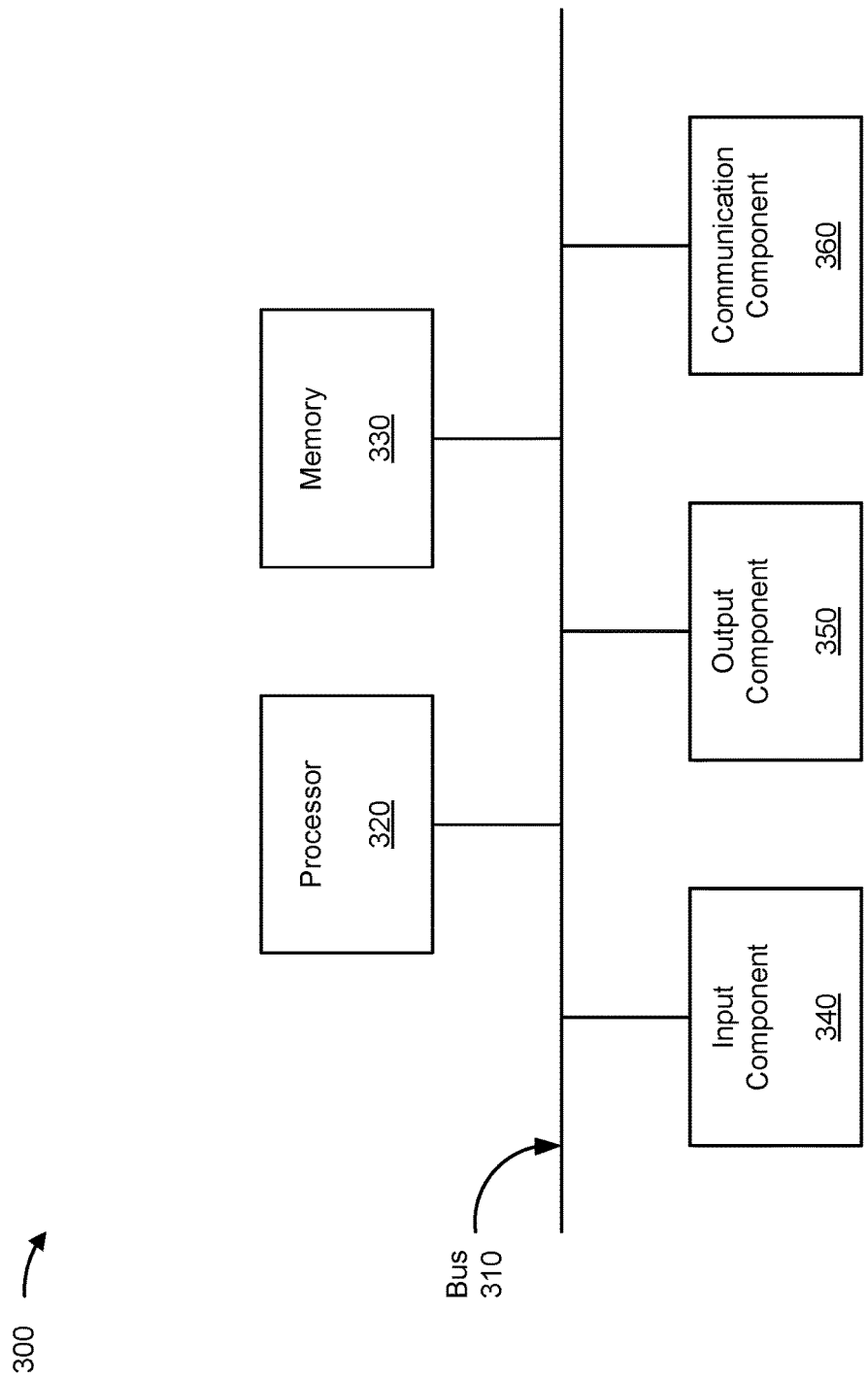
FIG. 3 is a diagram of example components of a device associated with combining SQL queries, in accordance with some embodiments of the present disclosure.

FIG. 3 is a diagram of example components of a device 300 associated with combining SQL queries. The device 300 may correspond to SQL query combiner device 210. In some implementations, SQL query combiner device 210 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
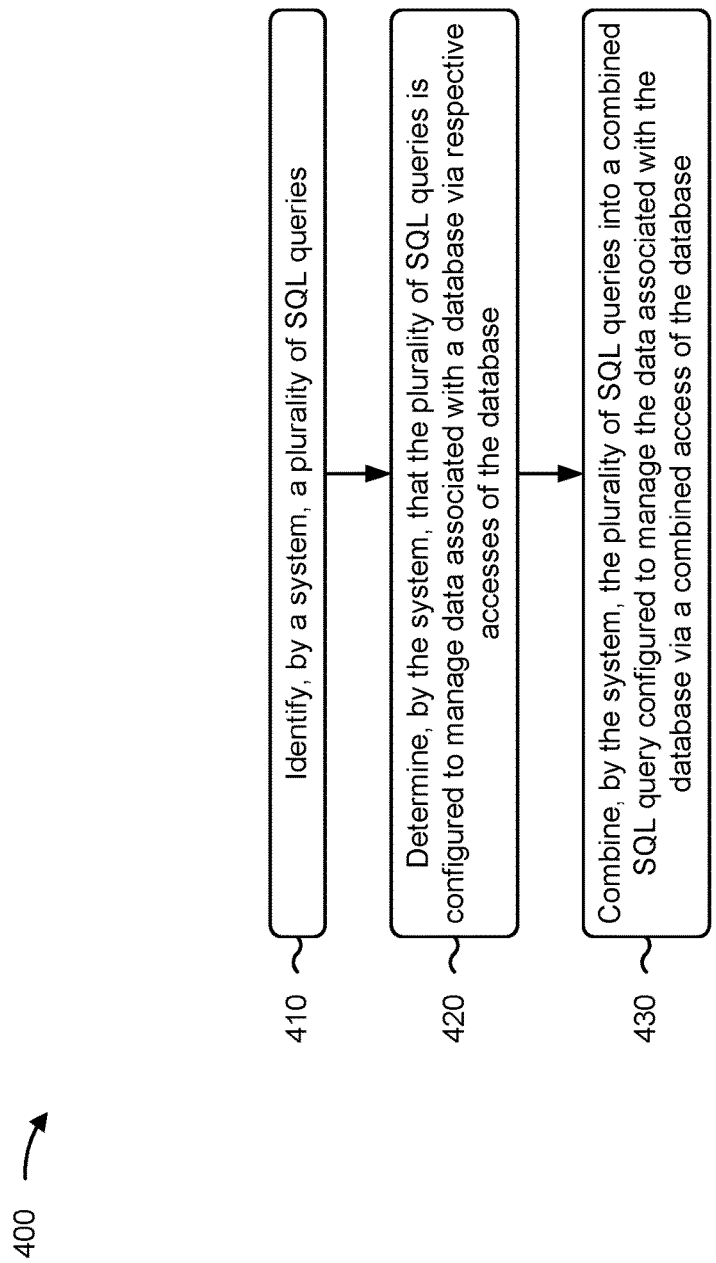
FIG. 4 is a flowchart of an example process associated with combining SQL queries, in accordance with some embodiments of the present disclosure.

FIG. 4 is a flowchart of an example process 400 associated with combining SQL queries. In some implementations, one or more process blocks of FIG. 4 may be performed by the SQL query combiner device 210. In some implementations, one or more process blocks of FIG. 4 may be performed by another device or a group of devices separate from or including the SQL query combiner device 210, such as the client device 220. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include identifying a plurality of SQL queries (block 410). For example, the SQL query combiner device 210 (e.g., using processor 320 and/or memory 330) may identify a plurality of SQL queries, as described above in connection with reference number 110 of FIG. 1. As an example, the plurality of SQL queries may be configured to retrieve data stored in a database.

As further shown in FIG. 4, process 400 may include determining that the plurality of SQL queries is configured to manage data associated with a database via respective accesses of the database (block 420). For example, the SQL query combiner device 210 (e.g., using processor 320 and/or memory 330) may determine that the plurality of SQL queries is configured to manage data associated with a database via respective accesses of the database, as described above in connection with reference number 120 of FIG. 1. As an example, the SQL query combiner device may determine that the plurality of SQL queries is configured to retrieve data associated with the database based on a plurality of from statements contained in the plurality of SQL queries.

As further shown in FIG. 4, process 400 may include combining the plurality of SQL queries into a combined SQL query configured to manage the data associated with the database via a combined access of the database (block 430). For example, the SQL query combiner device 210 (e.g., using processor 320 and/or memory 330) may combine the plurality of SQL queries into a combined SQL query configured to manage the data associated with the database via a combined access of the database, as described above in connection with reference number 130 of FIG. 1. As an example, the combined SQL query may contain a combined select statement, one or more case statements, from the plurality of SQL queries, inserted under the select statement, and a from statement identifying the database.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIG. 1. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code-it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for structured query language (SQL) query combination, the system comprising:
   one or more memories; and
   one or more processors, communicatively coupled to the one or more memories, configured to:
      determine that a plurality of SQL queries is configured to be executed repeatedly to manage data, associated with a database, via a plurality of accesses of the database,
      wherein the plurality of SQL queries includes a plurality of case statements;
      generate a dictionary that correlates the plurality of SQL queries with databases indicated in from statements of the plurality of SQL queries;
      combine, based at least in part on the dictionary, the plurality of SQL queries into a combined SQL query configured to manage the data via a combined access of the database,
         wherein the combined SQL query includes a combined select statement that identifies:
            one or more attributes of a first SQL query, of the plurality of SQL queries, associated with a first portion of the data, and
            one or more attributes of a second SQL query, of the plurality of SQL queries, associated with a second portion of the data, and
         wherein the plurality of case statements is combined into the combined SQL query under the combined select statement; and
      execute, in a first time that is shorter than a second time associated with executing the plurality of SQL queries, the combined SQL query to perform the combined access of the database once, via a single call of the combined SQL query, to manage the data associated with repeated executions of the plurality of SQL queries.

2. The system of claim 1, wherein the plurality of SQL queries includes a plurality of select statements, and wherein the one or more processors, to combine the plurality of SQL queries, are configured to:
   combine the plurality of select statements into the combined select statement.

3. The system of claim 1, wherein the one or more processors, to determine that the plurality of SQL queries is configured to manage the data associated with the database, are configured to:
   determine that the plurality of SQL queries is configured to manage the data associated with the database based at least in part on a plurality of from statements in the plurality of SQL queries.

4. The system of claim 1, wherein the one or more processors are further configured to:
   determine that at least one SQL query of the plurality of SQL queries has been updated; and
   determine, based at least in part on determining that the at least one SQL query has been updated, whether the plurality of SQL queries is configured to manage the data associated with the database.

5. The system of claim 1, wherein the plurality of SQL queries is associated with an exchange involving a vehicle.

6. A method for structured query language (SQL) query combination, comprising:
   determining, by a system, that a plurality of SQL queries is configured to be executed repeatedly to manage data, associated with a database, via a plurality of accesses of the database,
   wherein the plurality of SQL queries includes a plurality of case statements;
   generating a dictionary that correlates the plurality of SQL queries with databases indicated in from statements of the plurality of SQL queries;
   combining, by the system, based at least in part on the dictionary, the plurality of SQL queries into a combined SQL query,
   wherein the combined SQL query includes a combined select statement that identifies:
      one or more attributes of a first SQL query, of the plurality of SQL queries, associated with a first portion of the data, and
      one or more attributes of a second SQL query, of the plurality of SQL queries, associated with a second portion of the data, and
   wherein the plurality of case statements is combined into the combined SQL query under the combined select statement; and managing the data associated with repeated executions of the plurality of SQL queries, by executing the combined SQL query via a single call in a first time that is shorter than a second time associated with executing the plurality of SQL queries, via a combined access of the database.

7. The method of claim 6, wherein the plurality of SQL queries includes a plurality of select statements, and wherein combining the plurality of SQL queries includes:
   combining the plurality of select statements into the combined select statement.

8. The method of claim 6, wherein determining that the plurality of SQL queries is configured to manage the data associated with the database includes:
   determining that the plurality of SQL queries is configured to manage the data associated with the database based at least in part on a plurality of from statements in the plurality of SQL queries.

9. The method of claim 6, further comprising:
   determining that at least one SQL query of the plurality of SQL queries has been updated; and
   determining, based at least in part on determining that the at least one SQL query has been updated, whether the plurality of SQL queries is configured to manage the data associated with the database.

10. The method of claim 6, wherein the plurality of SQL queries is associated with an exchange involving a vehicle.

11. A non-transitory computer-readable medium storing a set of instructions, the set of instructions comprising:
   one or more instructions that, when executed by one or more processors of a system for structured query language (SQL) query combination, cause the system to:
      determine that a plurality of SQL queries is configured to be executed repeatedly to retrieve data from a database via a plurality of accesses of the database, wherein the plurality of SQL queries includes a plurality of case statements;
      generate a dictionary that correlates the plurality of SQL queries with databases indicated in from statements of the plurality of SQL queries;
      combine, based at least in part on the dictionary, the plurality of SQL queries into a combined SQL query configured to retrieve the data from the database via a combined access of the database,
      wherein the combined SQL query includes a combined select statement that identifies:
         one or more attributes of a first SQL query, of the plurality of SQL queries, associated with a first portion of the data, and
         one or more attributes of a second SQL query, of the plurality of SQL queries, associated with a second portion of the data, and
      wherein the plurality of case statements is combined into the combined SQL query under the combined select statement; and
   execute, in a first time that is shorter than a second time associated with executing the plurality of SQL queries, the combined SQL query to perform the combined access of the database once, via a single call of the combined SQL query, to manage the data associated with repeated executions of the plurality of SQL queries.

12. The non-transitory computer-readable medium of claim 11, wherein the plurality of SQL queries includes a plurality of select statements, and wherein the one or more instructions that cause the system to combine the plurality of SQL queries cause the system to:
   combine the plurality of select statements into the combined select statement.

13. The non-transitory computer-readable medium of claim 11, wherein the one or more instructions that cause the system to determine that the plurality of SQL queries is configured to retrieve the data from the database, cause the system to:
   determine that the plurality of SQL queries is configured to retrieve the data from the database based at least in part on a plurality of from statements in the plurality of SQL queries.

14. The non-transitory computer-readable medium of claim 11, wherein the one or more instructions further cause the system to:
   determine that at least one SQL query of the plurality of SQL queries has been updated; and
   determine, based at least in part on determining that the at least one SQL query has been updated, whether the plurality of SQL queries is configured to retrieve the data from the database.

15. The system of claim 1, wherein the combined select statement includes only one select statement that identifies the one or more attributes of the first SQL query and the one or more attributes of the second SQL query.

16. The method of claim 6, wherein the combined select statement includes only one select statement that identifies the one or more attributes of the first SQL query and the one or more attributes of the second SQL query.

17. The system of claim 1, wherein the combined select statement identifies a data type of the data.

18. The method of claim 6, wherein the combined select statement identifies a data type of the data.

19. The non-transitory computer-readable medium of claim 11 wherein the combined select statement includes only one select statement that identifies the one or more attributes of the first SQL query and the one or more attributes of the second SQL query.

* * * * *